(12) United States Patent
Huang et al.

(10) Patent No.: US 11,793,345 B2
(45) Date of Patent: Oct. 24, 2023

(54) MULTIFUNCTIONAL COOKER

(71) Applicant: Guangdong Shunde Ouning Technology Electrical Appliance Co., Ltd., Guangdong (CN)

(72) Inventors: Zhenxiong Huang, Guangdong (CN); Yun Yang, Guangdong (CN)

(73) Assignee: GUANGDONG SHUNDE OUNING TECHNOLOGY ELECTRICAL APPLIANCE CO., LTD., Guangdong (CN)

( * ) Notice: Subject to any disclaimer, the term of this patent is extended or adjusted under 35 U.S.C. 154(b) by 263 days.

(21) Appl. No.: 16/964,403

(22) PCT Filed: Nov. 16, 2018

(86) PCT No.: PCT/CN2018/115831
§ 371 (c)(1),
(2) Date: Jul. 23, 2020

(87) PCT Pub. No.: WO2019/237652
PCT Pub. Date: Dec. 19, 2019

(65) Prior Publication Data
US 2021/0045569 A1 Feb. 18, 2021

(30) Foreign Application Priority Data
Jun. 12, 2018 (CN) .......................... 201810603164.1

(51) Int. Cl.
*A47J 27/086* (2006.01)
*A47J 27/09* (2006.01)
*A47J 37/06* (2006.01)

(52) U.S. Cl.
CPC ............ *A47J 27/086* (2013.01); *A47J 27/09* (2013.01); *A47J 37/0641* (2013.01)

(58) Field of Classification Search
None
See application file for complete search history.

(56) References Cited

U.S. PATENT DOCUMENTS 6,505,546 B1    1/2003    Koether et al.

FOREIGN PATENT DOCUMENTS

| CN | 2066282 U | 11/1990 | |
|----|-----------|---------|---|
| CN | 2213506 Y * | 11/1995 | ............ A47J 36/10 |

(Continued)

OTHER PUBLICATIONS

Machine translation for CN 107684357 A1 performed on Apr. 29, 2022, Pi et al. (Year: 2018).*

(Continued)

*Primary Examiner* — Dana Ross
*Assistant Examiner* — Kevin Guanhua Wen
(74) *Attorney, Agent, or Firm* — MUNCY, GEISSLER, OLDS & LOWE, P.C.

(57) ABSTRACT

The present invention relates to a kitchenware, and in particular, relates to a multifunctional cooker. The multifunctional cooker comprise a cooker body (109) and an upper cover assembly, wherein the upper cover assembly is provided with a heating assembly (102) and a wind power assembly (103), and the multifunctional cooker is provided with a first member (600) which is connectable with the upper cover assembly, the first member (600) being capable of sealing the cooker body (109), which conveniently realizes the switch between the function of pressure cooker and the function of air fryer.

16 Claims, 8 Drawing Sheets

(56) References Cited

FOREIGN PATENT DOCUMENTS

| CN | 2469839 Y | | 1/2002 | |
|---|---|---|---|---|
| CN | 203776727 U | * | 8/2014 | .......... A47J 37/0641 |
| CN | 106213986 A | * | 12/2016 | ........... A47J 27/086 |
| CN | 106419521 A1 | * | 2/2017 | .............. A47J 27/09 |
| CN | 205923814 U | * | 2/2017 | .......... A47J 37/0641 |
| CN | 206119969 U | | 4/2017 | |
| CN | 106691172 A1 | * | 5/2017 | .............. A47J 36/38 |
| CN | 206560354 U | * | 10/2017 | .......... A47J 37/0641 |
| CN | 206565769 U | * | 10/2017 | .............. A47J 27/08 |
| CN | 107684357 A | | 2/2018 | |
| CN | 107684357 A1 | * | 2/2018 | .......... A47J 37/0641 |
| CN | 108634807 A | | 10/2018 | |
| FR | 2940389 A1 | * | 6/2010 | ............. B65D 53/00 |
| KR | 20100011594 U | * | 11/2010 | ........... A47J 27/092 |
| KR | 20110117819 A | * | 10/2011 | .......... A47J 27/0815 |

OTHER PUBLICATIONS

Machine translation for CN 106691172 A1 performed on Apr. 29, 2022, Gong et al. (Year: 2017).*

Machine translation for CN 106419521 A1 performed on Apr. 29, 2022, Li et al. (Year: 2017).*

Machine translation for CN 205923814 U performed on Apr. 29, 2022, Guo et al. (Year: 2017).*

Machine translation for CN 203776727 U performed on Apr. 29, 2022, Lin (Year: 2014).*

Machine translation for CN 206560354 U performed on Apr. 29, 2022, Zhu et al. (Year: 2017).*

Machine translation for CN 2213506 Y performed on Apr. 29, 2022, Wang (Year: 1995).*

Machine translation for FR 2940389 A1 performed on Apr. 29, 2022, Chameroy et al. (Year: 2010).*

Machine translation for CN 206565769 U performed on Apr. 29, 2022, Unannounced Inventor (Year: 2017).*

Machine translation of KR 20110117819 A performed on Nov. 3, 2022, Lee et al. (Year: 2011).*

Machine translation of KR 20100011594 U performed on Nov. 3, 2022, Yoo (Year: 2010).*

Machine translation of CN 106213986 A performed on Nov. 3, 2022, Xu et al. (Year: 2016).*

International Search Report for Application No. PCT/CN2018/115831, dated Mar. 1, 2019, pp. 1-2.

* cited by examiner

MULTIFUNCTIONAL COOKER

CROSS-REFERENCE TO RELATED APPLICATIONS

The present application is a national phase entry under 35 U.S.C § 371 of International Application No. PCT/CN2018/115831 filed Nov. 16, 2018, which claims priority from Chinese Application No. 201810603164.1 filed Jun. 12, 2018, all of which are hereby incorporated herein by reference.

TECHNICAL FIELD

The present invention relates to a kitchenware, and in particular, relates to a multifunctional cooker.

BACKGROUND

Existing consumers are constantly pursuing healthy cooking and a diet full of color, aroma and taste. Pressure cooking has pressure penetration and can reach a certain temperature. It is generally considered in the market that this function may realize healthy and nutritious cooking. However, after using pressure cooking, the skin color and taste of the food cannot achieve the sense of crispy and delicious. If it can also be baked, the food will be full of color, aroma and taste, and pulsing function of health and nutrition, the food be popular with consumers and has huge market potential. The existing pressure cooker only has the function of pressure cooking. Similarly, the existing air fryer only has the function of cooking food by hot air. At present, there is no product that has both functions of pressure cooking and air baking and frying. The invention integrates the functions of pressure cooking and air baking and frying, and realizes two functions on one product. It can not only realize functions of pressure cooking for rice, porridge, soup and other functions, but also use the product to realize functions of frying potato chips, chicken wings, beef, and spareribs and other functions. It may also use the product to pressure cook and then bake and fry the food, so that the pressure cooking and the baking and frying are used as two cooking stages for the same food. The multifunctional cooker realizes the multipurpose of one cooker.

SUMMARY

To overcome at least one of the defects in the above prior art, the present invention provides a multifunctional cooker integrated with functions of pressure cooker and air fryer, which conveniently realizes the switch between the function of pressure cooker and the function of air fryer.

In order to solve the above technical problems, the present invention adopts the following technical solution: a multifunctional cooker, comprising a cooker body and an upper cover assembly, wherein the upper cover assembly is provided with a heating assembly and a wind power assembly, the multifunctional cooker is provided with a first member which is connectable with the upper cover assembly, the first member is capable of sealing the cooker body, and the first member is capable of releasing pressure when the pressure inside the cooker body exceeds a threshold.

In the present invention, the cooker body and the upper cover assembly are connected with each other, and the upper cover assembly is rotated relative to the cooker body to realize the opening or closing of the upper cover assembly relative to the cooker body. The upper cover assembly is provided with a heating assembly and a wind power assembly. When realizing the function of pressure cooker, the first member is used to realize the sealing for the cooker body. When realizing the function of air fryer, the cooperation between the first member and the upper cover assembly is released to realize the communication of the heating assembly and the wind power assembly provided on the upper cover assembly with the cooker body. By the cooperation of the heating assembly and the wind power assembly, the heating assembly heats the air, the wind power assembly realizes the flow of the air, and the function of air fryer is realized. The first member can be sealedly cooperated with the cooker body to realize the increasing of the pressure in the cooker body. When the pressure in the cooker body exceeds the threshold, the first member can release the pressure from the cooker body.

In one embodiment, the first member is a cover-shaped structure cooperated with a structure of the cooker body. The first member is used for sealing the cooker body and realizing high pressure in the cooker body. The first member of cover-shaped structure realizes the sealing for the opening of the cooker body and is used for realizing the high pressure function.

In one embodiment, the upper cover assembly is provided with a first position limiting member, and the first member is provided with a first position limiting mechanism which is cooperatively connectable with the first position limiting member. When the multifunctional cooker realizes the function of pressure cooker, the first position limiting member is cooperated with the first position limiting mechanism provided on the first member to position the first member.

Preferably, the upper cover assembly is provided with a second position limiting member, and the first member is provided with a second position limiting mechanism which is cooperatively connectable with the second position limiting member. On the premise of the cooperation between the first position limiting member and the first position limiting mechanism, the fixed connection between the first member and the upper cover assembly is realized by the cooperation of the second position limiting member and the second position limiting mechanism.

Preferably, the first position limiting member is a steel cover structure provided on the upper cover assembly, the first position limiting member is capable of realizing a fixed connection between the upper cover assembly and the cooker body, and the first position limiting mechanism is a position limiting pair connected with the first position limiting member. The first position limiting member is a steel cover structure and the fixed connection between the upper cover assembly and the cooker body can be realized by the first position limiting member of steel cover structure. The position limiting pair is connected with the first position limiting member to realize fixed connection between the first position limiting member and the upper cover assembly.

Preferably, the second position limiting member is a position limiting hole on the first position limiting member, and the second position limiting mechanism is a position limiting post on the first member. The second position limiting mechanism is arranged to be the position limiting post on the first member and the position limiting post is fitted with the position limiting hole on the first position limiting member. On the premise that the first member is connected with the first position limiting member by the position limiting pair, the position limiting post is fitted with the position limiting hole on the first position limiting member to realize the fixed connection between the first member and the first position limiting member.

Preferably, the upper cover assembly is provided with a heat insulation assembly, the first position limiting member is a positioning hole on the heat insulation assembly, and the first position limiting mechanism is a first protruding portion cooperated with the positioning hole. The heat insulation assembly is provided with the positioning hole, the first position limiting member is the positioning hole, and the first position limiting mechanism is the first protruding portion. The connection between the first member and the heat insulation assembly is realized by the cooperated connection between the first protruding portion and the positioning hole.

Preferably, the second position limiting mechanism is a second protruding portion, and the second position limiting member is provided with a sliding block slidingly connected with the heat insulation assembly by a positioning plate. An elastic member is provided between the sliding block and the heat insulation assembly. The sliding block is provided with a sliding surface cooperated with the second protruding portion, and the sliding block is provided with a position limiting protruding portion connected with the second protruding portion and the elastic member. The sliding block is slidingly connected with the heat insulation assembly by the positioning plate to realize the sliding connection between the sliding block and the heat insulation assembly. Under the action of the elastic member, the sliding block is capable of moving reciprocally relative to the heat insulation assembly. The sliding block is provided with the sliding surface. The sliding surface is pressed by the second protruding portion to realize the movement of the sliding block relative to the heat insulation assembly. When the second protruding portion crosses the sliding surface, the sliding block is reset under the action of the elastic member. The position limiting protruding portion realizes position limitation to the second protruding portion and the sliding block.

In one embodiment, the multifunctional cooker is provided with a second member, and the second member is sealedly connectable with the cooker body and the upper cover assembly. When realizing the function of pressure cooker, the first member is cooperatively connected with the upper cover assembly to seal the cooker body to realize the high pressure function. When it is necessary to realize the function of air fryer, the cooperation between the first member and the upper cover assembly is released and the first member is taken out to realize the communication of the heating assembly and the wind power assembly provided on the upper cover assembly with the cover body, and at the same time, the second member is connected with the upper cover assembly to sealed the connection between the cooker body and the upper cover assembly, ensuring the overall tightness of the multifunctional cooker.

In one embodiment, the second member is a lantern ring structure cooperated with a structure of the cooker body, and the second member realizes an airtight connection between the upper cover assembly and the cooker body. When realizing the function of air fryer, the second member of the lantern ring structure realizes the sealed connection between the cooker body and the upper cover assembly, and at the same time the second member of the lantern ring structure can also realize the opening of the cooker body relative to the upper cover assembly, facilitating the hot air heated by the heating assembly and the wind power assembly to enter into the cooker body.

Preferably, the upper cover assembly is provided with a first position limiting member, and the second member is provided with a first position limiting mechanism that is cooperatively connectable with the first position limiting member. When the multifunctional cooker realizes the function of pressure cooker, the first position limiting member is cooperated with the first position limiting mechanism provided on the second member to position the first member.

Preferably, the upper cover assembly is provided with a second position limiting member, and the second member is provided with a second position limiting mechanism that is cooperatively connectable with the second position limiting member. On the premise of the cooperation between the first position limiting member and the first position limiting mechanism, the fixed connection between the first member and the upper cover assembly by the cooperation of the second position limiting member and the second position limiting mechanism.

Preferably, the first position limiting member is a steel cover structure provided on the upper cover assembly, the first position limiting member is capable of realizing a fixed connection between the upper cover assembly and the cooker body, and the first position limiting mechanism is a position limiting pair connected with the first position limiting member. The first position limiting member is a steel cover structure and the fixed connection between the upper cover assembly and the cooker body can be realized by the first position limiting member of steel cover structure. The position limiting pair is connected with the first position limiting member to realize the fixed connection between the first position limiting member and the upper cover assembly.

Preferably, the second position limiting member is a position limiting hole on the first position limiting member, and the second position limiting mechanism is a position limiting post on the first member. The second position limiting mechanism is arranged to be the position limiting post on the first member and the position limiting post is fitted with the position limiting hole in the first position limiting member. On the premise that the first member is connected with the first position limiting member by the position limiting pair, the position limiting post is fitted with the position limiting hole on the first position limiting member to realize the fixed connection between the second member and the first position limiting member.

Preferably, the upper cover assembly is provided with a heat insulation assembly. The first position limiting member is a positioning hole provided on the heat insulation assembly. The first position limiting mechanism is a first protruding portion cooperated with the positioning hole. The heat insulation assembly is provided with the positioning hole, the first position limiting member is the positioning hole, and the first position limiting mechanism is the first protruding portion. The connection between the first member and the heat insulation assembly is realized by the cooperated connection between the first protruding portion and the positioning hole.

Preferably, the second position limiting mechanism is a second protruding portion, and the second position limiting member is provided with a sliding block slidingly connected with the heat insulation assembly by a positioning plate. An elastic member is provided between the sliding block and the heat insulation assembly, and the sliding block is provided with a sliding surface cooperated with the second protruding portion. The sliding block is provided with a position limiting protruding portion connected with the second protruding portion and the elastic member. The sliding block is slidingly connected with the heat insulation assembly by the positioning plate to realize the sliding connection between the sliding block and the heat insulation assembly. Under the action of the elastic member, the sliding block is capable of moving reciprocally relative to the heat insulation assembly. The sliding block is provided with the sliding surface. The sliding surface is pressed by the second protruding portion to realize the movement of the sliding block relative to the heat insulation assembly. When the second protruding portion crosses the sliding surface, the sliding block is reset under the action of the elastic member. The position limiting protruding portion realizes position limitation to the second protruding portion and the sliding block.

In one embodiment, the first member is provided with an assembly A and an assembly B, and the assembly B is sealedly connected with the assembly A by a sealing gasket. The sealed connection between the assembly A and the assembly B is realized by the sealing gasket.

Preferably, the first member is provided with a pressure limiting valve assembly, and an arc-shaped structure cooperated with an inner pot is provided at the connection of the sealing gasket with the inner pot. The first member is provided with a pressure limiting valve assembly to adjust the pressure in the cooker body during use. In order to further improve the sealing of the first member to the cooker body, the sealed cooperation between the sealing gasket and the cooker body is improved by the arc-shaped structure.

Preferably, the first position limiting mechanism is fixedly connected with the assembly A, and the second position limiting mechanism is connected with the assembly A by a sealing ring. The first position limiting mechanism is fixedly provided on the assembly A and the second position limiting mechanism is connected with the assembly A by the seal ring to improve the sealing of the connection.

Preferably, the pressure limiting valve assembly is provided with an exhaust pipe and a protective shield which is connected with the assembly A, and the exhaust pipe is connected with the assembly A by the sealing ring.

In one embodiment, the second member is provided with an assembly C and an assembly D, and the assembly D is connected with the assembly C by a sealing ring. The assembly C and the assembly D are connected with each other by the sealing ring to improve the sealing of the connection.

Preferably, the first position limiting mechanism is fixedly connected with the assembly C, and the second position limiting mechanism is fixedly connected with the assembly C by the sealing ring. The first position limiting mechanism is fixedly provided on the assembly C and the second position limiting mechanism is connected with the assembly C by the seal ring to improve the sealing of the connection.

Preferably, the assembly C is provided with a protruding portion for fixing the second position limiting mechanism and the first position limiting mechanism. The second member is ring-shaped, and the second position limiting mechanism and the first position limiting mechanism are provided on the assembly C. The protruding portion is provided on the assembly C. A mounting location is offered for the second position limiting mechanism and the first position limiting mechanism by the protruding portion.

Preferably, the heat insulation assembly is provided with a first heat insulation shield and a second heat insulation shield, and a protective shield is provided between the heating assembly and the second heat insulation shield. The heat insulation assembly is used for isolating the high temperature generated during the use of the cooker, and the first heat insulation shield and the second heat insulation shield are cooperated with each other to realize good heat insulation performance. The protective shield is provided between the heating assembly and the second heat insulation shield to protect the second heat insulation shield.

Preferably, the wind power assembly is provided with a fan provided between the protective shield and the second heat insulation shield, and the fan is driven by the wind power assembly to rotate. The fan rotates under the drive of the wind power assembly to realize the flow of hot air and the function of air fryer.

Compared with the prior art, the present invention has the following characteristics: mutual switch between the function of pressure cooker and the function of air fryer can be realized by the mutual replacement between the first member and the second member, and the two functions can be concentrated on one cooker to realize the purpose of multifunctional cooker.

DETAILED DESCRIPTION

Figure 1:
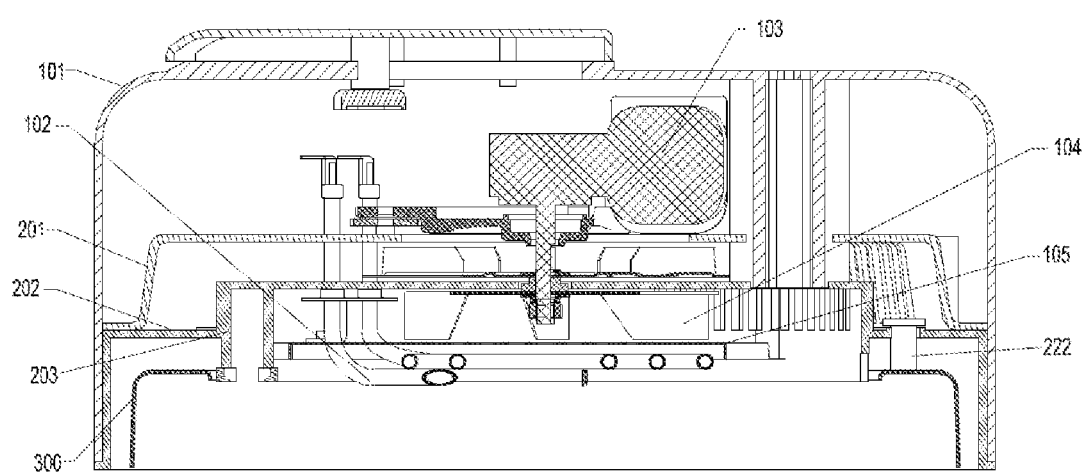
FIG. 1 is a schematic structural view of an upper cover assembly in an embodiment of the present invention.

The accompanying drawings are only for exemplary description, and shall not be construed as limiting the present invention. For ease of description, some parts or elements in the accompanying drawings may be omitted, scaled up or scaled down, which do not represent the practical dimensions of the product. For a person skilled in the art, it is understandable that some commonly known structures may be omitted in accompanying drawings and that their descriptions may be omitted. The positional relationship described in the accompanying drawings is for illustrative purposes only, and cannot be understood as limiting to the present invention.

Embodiment 1

As shown in FIG. 1 to FIG. 9, the present invention provides a multifunctional cooker, which is provided with a cooker body 109 and an upper cover assembly. The cooker body 109 is rotatably connected with the upper cover assembly. The upper cover assembly is provided with a heat insulation assembly 200, a heating assembly 102 and a wind power assembly 103.

The heat insulation assembly 200 is provided with a first heat insulation shield 201 and a second heat insulation shield 202, and the first heat insulation shield 201 and the second heat insulation shield 202 are connected with each other. The first heat insulation shield 201 and the second heat insulation shield 202 are fixedly connected with an upper shell 101 provided on the upper cover assembly.

The wind power assembly 103 is provided with a driving motor. The driving motor is fixedly provided on the first heat insulation shield 201. A driving shaft of the driving motor passes through the first heat insulation shield 201 and the second heat insulation shield 202, and a fan 104 is connected to one end of the driving shaft.

The cooker body 109 is provided with an inner pot 106 that realizes the function of pressure cooker and a fry basket 107 that realizes the function of air fryer. The inner pot 106 is used when realizing the function of pressure cooker, and the fry basket 107 is used when realizing the function of air fryer. The heating assembly 102 is provided with a heating tube, and the heating assembly 102 is provided between the second heat insulation shield 202 and the fry basket 107. The fan 104 is provided between the heating assembly 102 and the second heat insulation shield 202. A protective shield 105 is provided between heating assembly 102 and the fan 104. The contact between the fan 104 and the human body is avoided by the protective shield 105 to ensure the safety of the use process.

As shown in FIG. 1, in this embodiment, the second heat insulation shield 202 is connected with a first position limiting member 300. The first position limiting member 300 is a steel cover structure, and the first position limiting member 300 can be fixedly connected to the cooker body 109.

Figure 2:
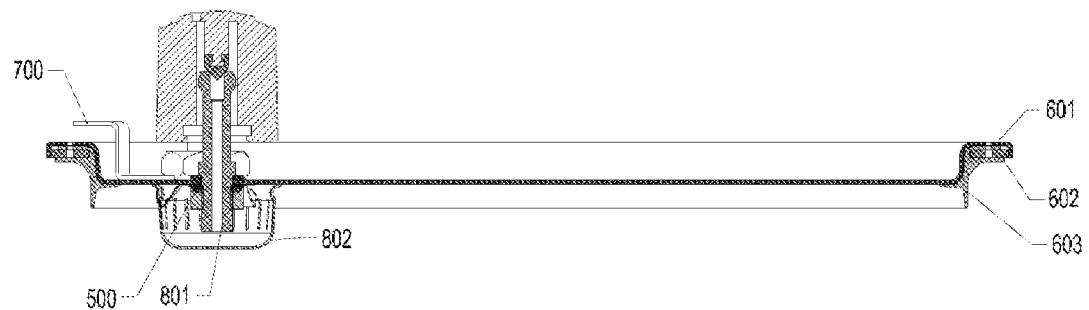
FIG. 2 is a schematic structural view of a first member in the embodiment of the present invention.
Figure 3:
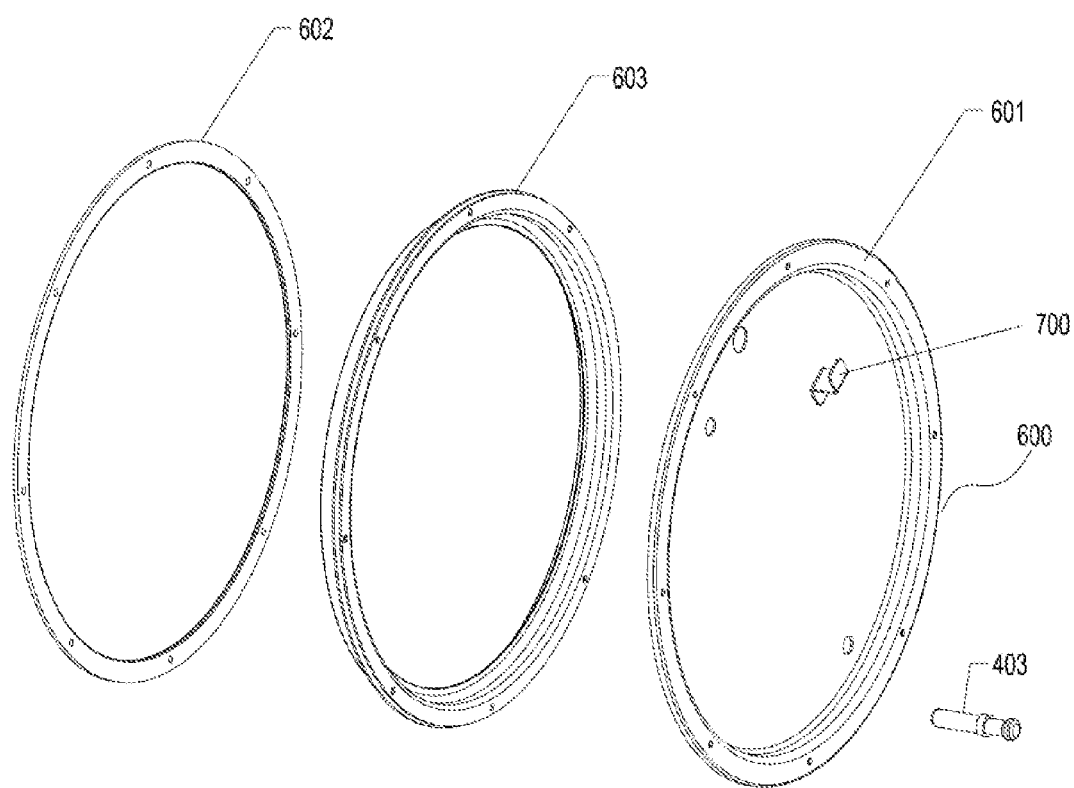
FIG. 3 is an exploded schematic structural view of the first member in the embodiment of the present invention.

As shown in FIG. 2 and FIG. 3, the first member 600 is a cover-shaped structure cooperated with a structure of the cooker body, and the first member 600 of the cover-shaped structure sealedly closes the cooker body.

The first member 600 is provided with an assembly A601 and an assembly B602, and the assembly A 601 is connected with the assembly B602 by a sealing gasket 603. The sealing gasket 603 is an arc-shaped structure, and the sealed connection between the first member 600 and the inner pot 106 is realized by the arc-shaped structure.

The assembly A601 is provided with a second position limiting mechanism 403 and a first position limiting mechanism 700. The second heat insulation shield 202 is provided with a second position limiting member 203 and the second position limit mechanism 403 can be fittedly connected with the second position limiting member 203 to realize the connection between the first member 600 and the second heat insulation shield 202.

Figure 6:
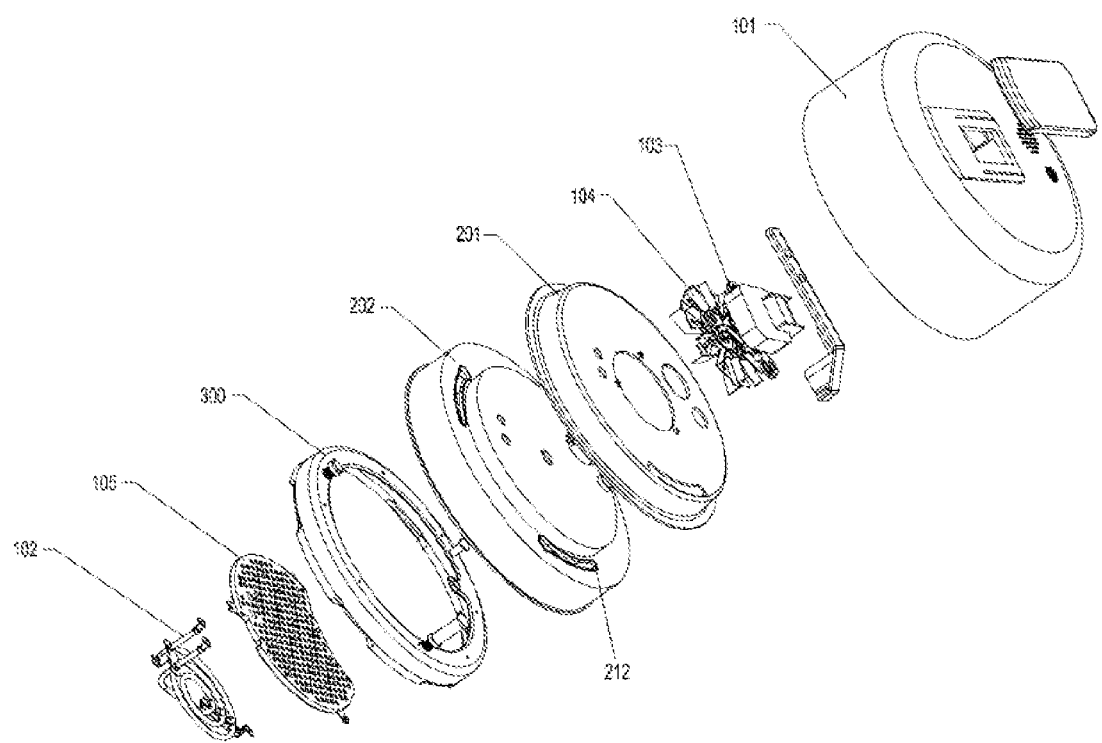
FIG. 6 is an exploded schematic structural view of the upper cover assembly in the embodiment of the present invention.
Figure 7:
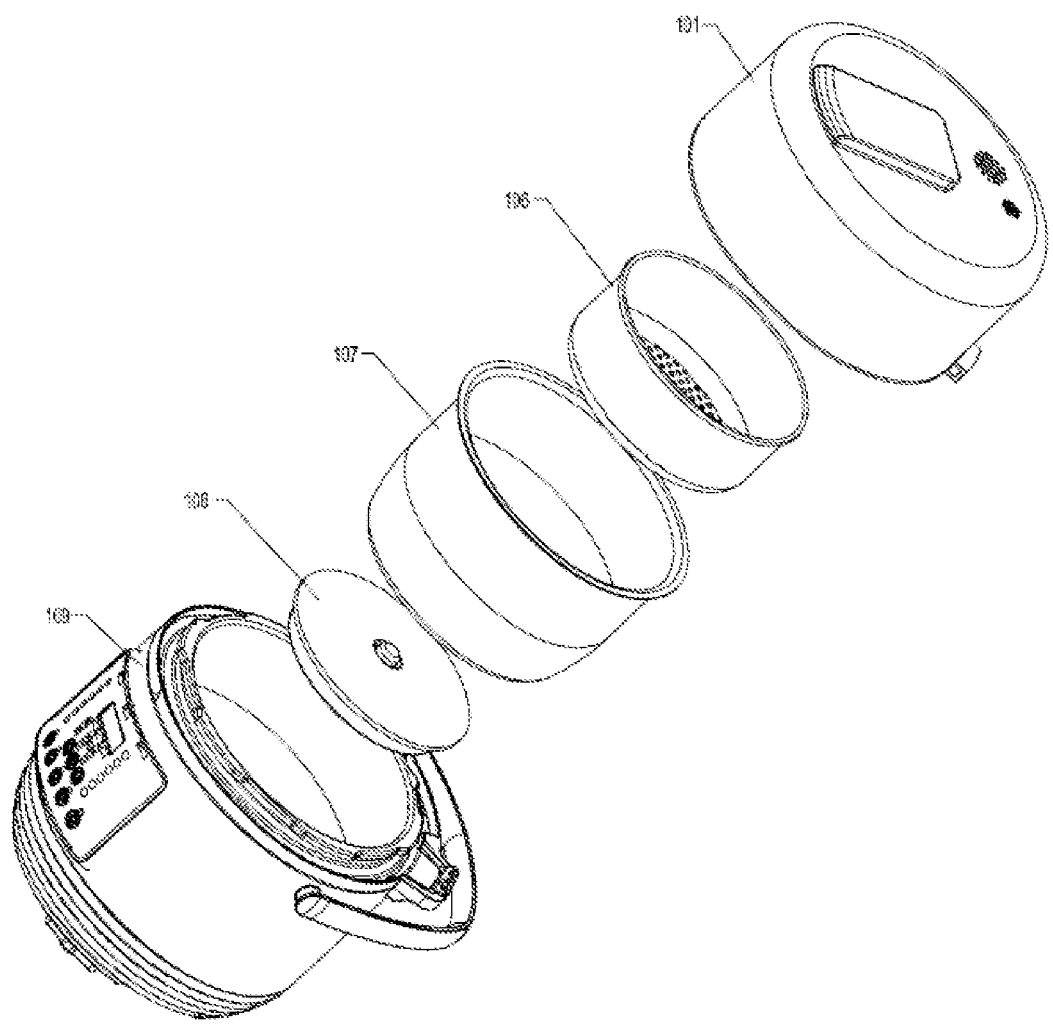
FIG. 7 is an exploded schematic structural view of a cooker body in the embodiment of the present invention.

As shown in FIG. 3 and FIG. 6, the first position limiting mechanism 700 is fixedly connected to the assembly A601. The first position limiting mechanism 700 is Z-shaped, and a gap is provided between the first position limiting mechanism 700 and the assembly A601. The second heat insulation shield 202 is provided with a sliding rail 212, the sliding rail 212 is connected with a connecting rod 222, and the connecting rod 222 is sealedly connected with the first position limiting member 300, thereby realizing the fixed connection of the first position limiting member 300 relative to the heat insulation assembly 200.

A plurality of sliding rails 212 are provided on the second heat insulation shield 202. The plurality of sliding rails 212 are cooperated with the connecting rod 222 to realize the fixed connection of the first position limiting member 300 relative to the heat insulation assembly 200.

The first position limiting member 300 is fitted between the first position limiting mechanism 700 and the assembly A601 by providing a gap between the first position limiting mechanism 700 and the assembly A601, thereby realizing the fixed connection between the assembly A601 and the first position limiting member 300. Under the joint action that the second position limiting mechanism 403 is fitted with the second position limiting member 203 and that the first position limiting member 300 is fitted between the first position limiting mechanism 700 and the assembly A601, the fixed connection between the first member 600 and the upper cover assembly is realized.

Figure 8:
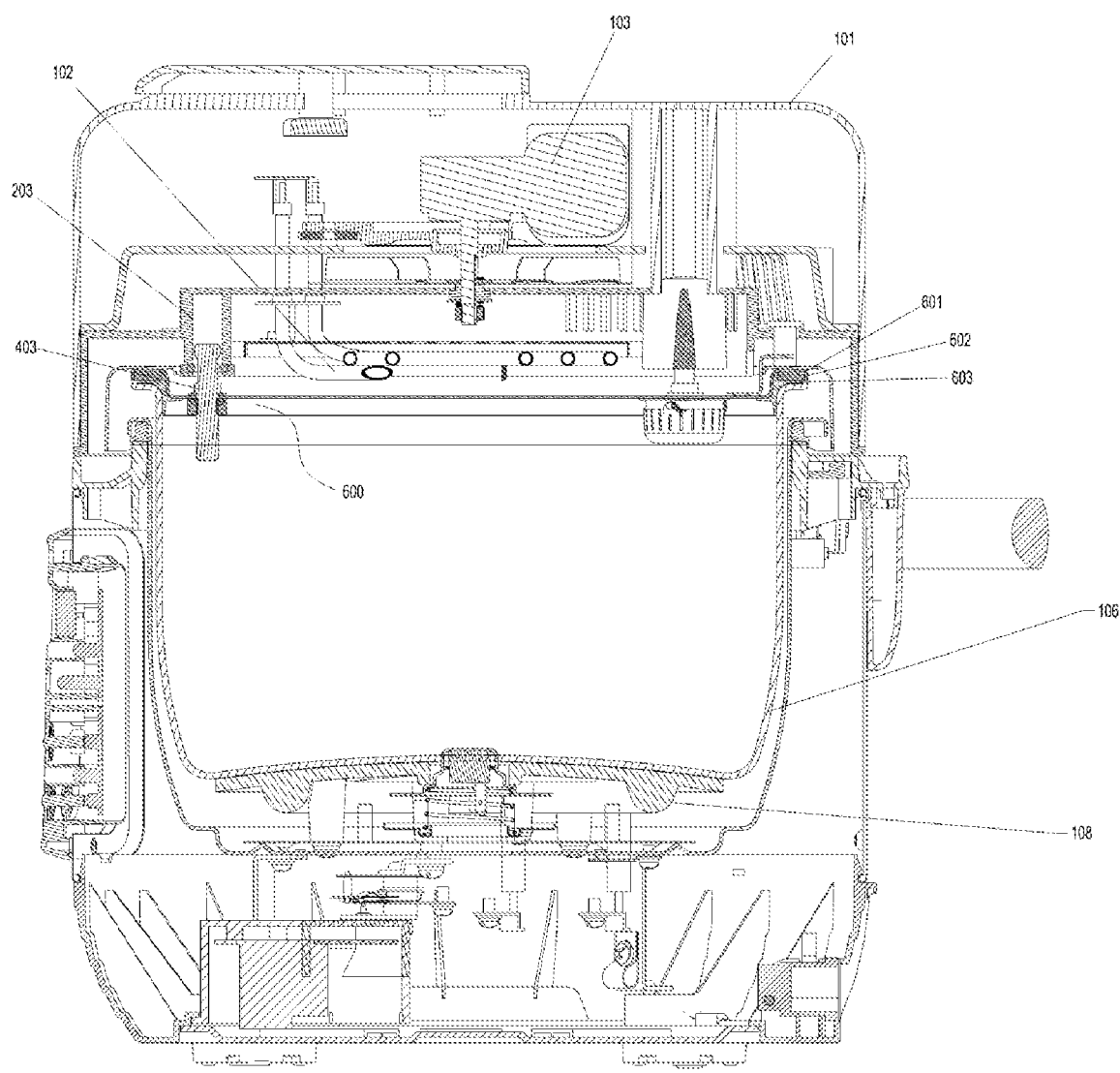
FIG. 8 is a sectional schematic structural view of a pressure cooker in the embodiment of the present invention.

As shown in FIG. 8, the upper cover assembly is closed relative to the cooker body 109, and the first member 600 presses against the edge of the inner pot 106 to seal the inner pot 106, and the pressure in the inner pot 106 is adjusted by a pressure limiting valve assembly provided on the first member 600. A heating plate assembly 108 realizes the function of pressure cooker.

As shown in FIG. 2, the pressure limiting valve assembly is provided with an exhaust pipe 801 and a protective shield 802 which is connected with the assembly A601. The exhaust pipe 801 is connected with the assembly A601 by a seal ring 500.

Figure 4:
FIG. 4 is a schematic structural view of a second member in the embodiment of the present invention.
Figure 5:
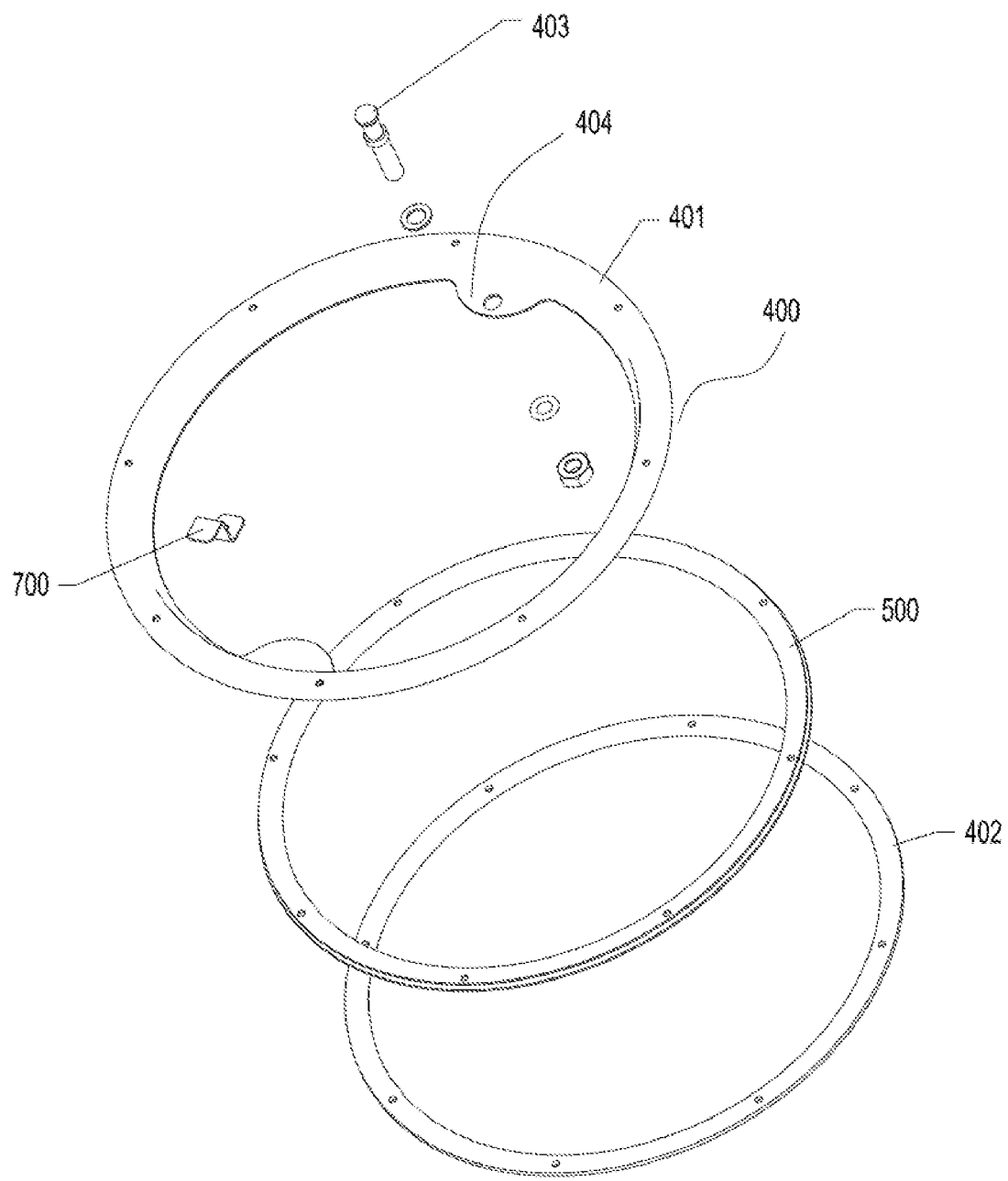
FIG. 5 is an exploded schematic structural view of the second member in the embodiment of the present invention.

As shown in FIG. 4 and FIG. 5, the second member 400 is a lantern ring structure cooperated with the structure of the cooker body 109, and and the second member 400 realizes an airtight connection between the upper cover assembly and the cooker body 109. The second member 400 is provided with an assembly C401 and an assembly D402 which is cooperated with the fry basket 107. The assembly D402 is sealedly connected to the assembly C401 by the sealing ring 500, thereby improving the tightness of the connection between the assembly C401 and the assembly D402.

As shown in FIG. 5, the assembly C401 is provided with a protruding structure used for fixing the second position limiting mechanism 403 and the first position limiting mechanism 700. The second position limiting mechanism 403 is cooperatively connected with the second position limiting member 203 on the second heat insulation shield 202. The first position limiting mechanism 700 is fixedly with the assembly C401. The first position limiting mechanism 700 is a Z-shaped position limiting pair. A gap is provided between the first position limiting mechanism 700 and the assembly C401.

The first position limiting member 300 is fitted between the first position limiting mechanism 700 and the assembly C401 to realize a fixed connection between the assembly C401 and the first position limiting member 300. Under the joint action that the second position limiting mechanism 403 is fitted with the second position limiting member 203 and that the first position limiting member 300 is fitted between the first position limiting mechanism 700 and the assembly C401, the fixed connection between the second member 400 and the upper cover assembly is realized.

Figure 9:
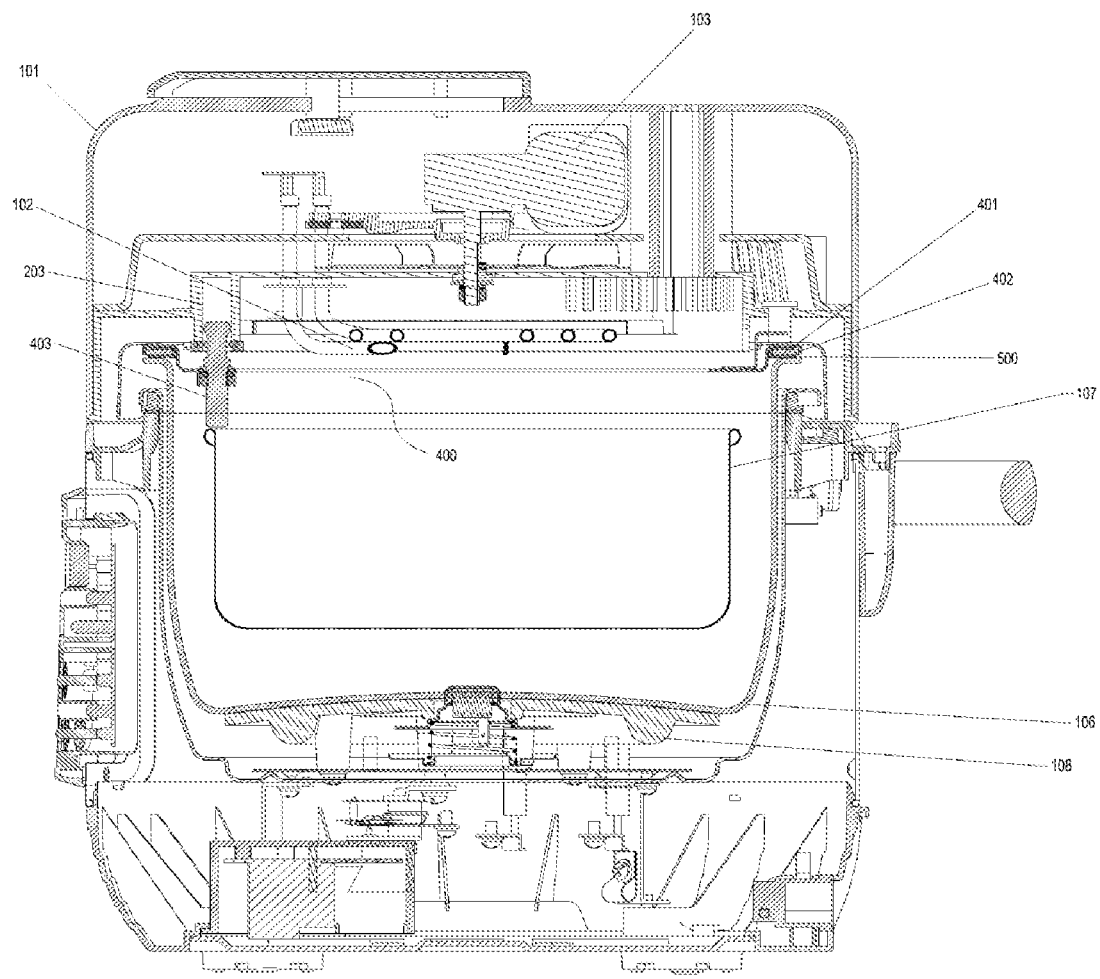
FIG. 9 is a sectional schematic structural view of an air fryer in the embodiment of the present invention.

As shown in FIG. 9, the upper cover assembly is closed relative to the cooker body 109; the second member 400 presses against the edge of the fry basket 107; the air is heated the heating assembly 102; the fan 104 is driven by the wind power assembly 103 to rotate; the fan 104 blows the hot air to flows through the second member 400, and the hot air enters the fry basket 107 to realize the function of air fryer.

Mutual switch between the function of pressure cooker and the function of air fryer can be realized by the mutual replacement between the first member 600 and the second member 400, and the two functions can be concentrated on one cooker to realize the purpose of multifunctional cooker.

Embodiment 2

Figure 10:
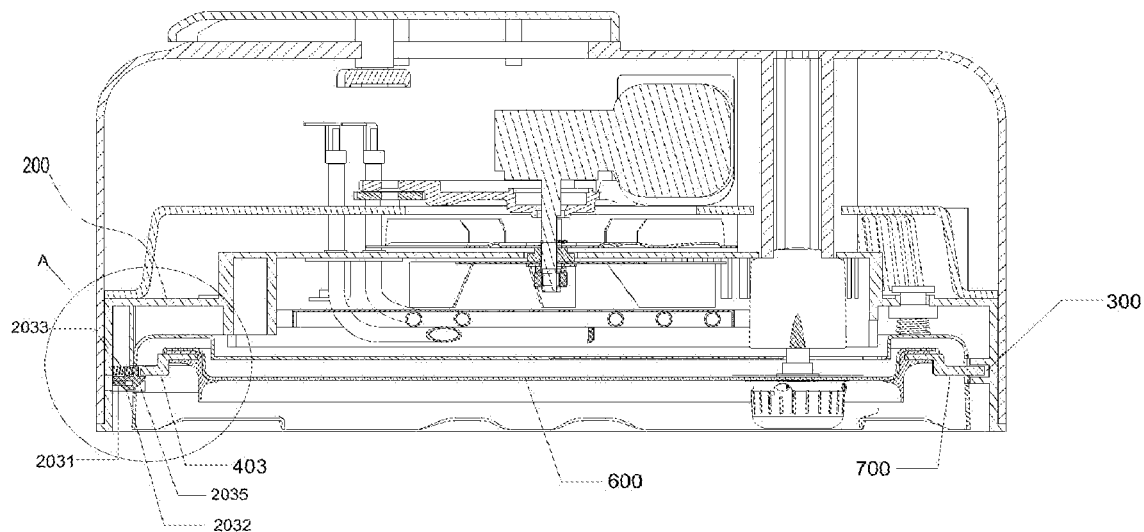
FIG. 10 is a schematic structural view which shows the connection between the first member and the upper cover assembly in the embodiment of the present invention.
Figure 11:
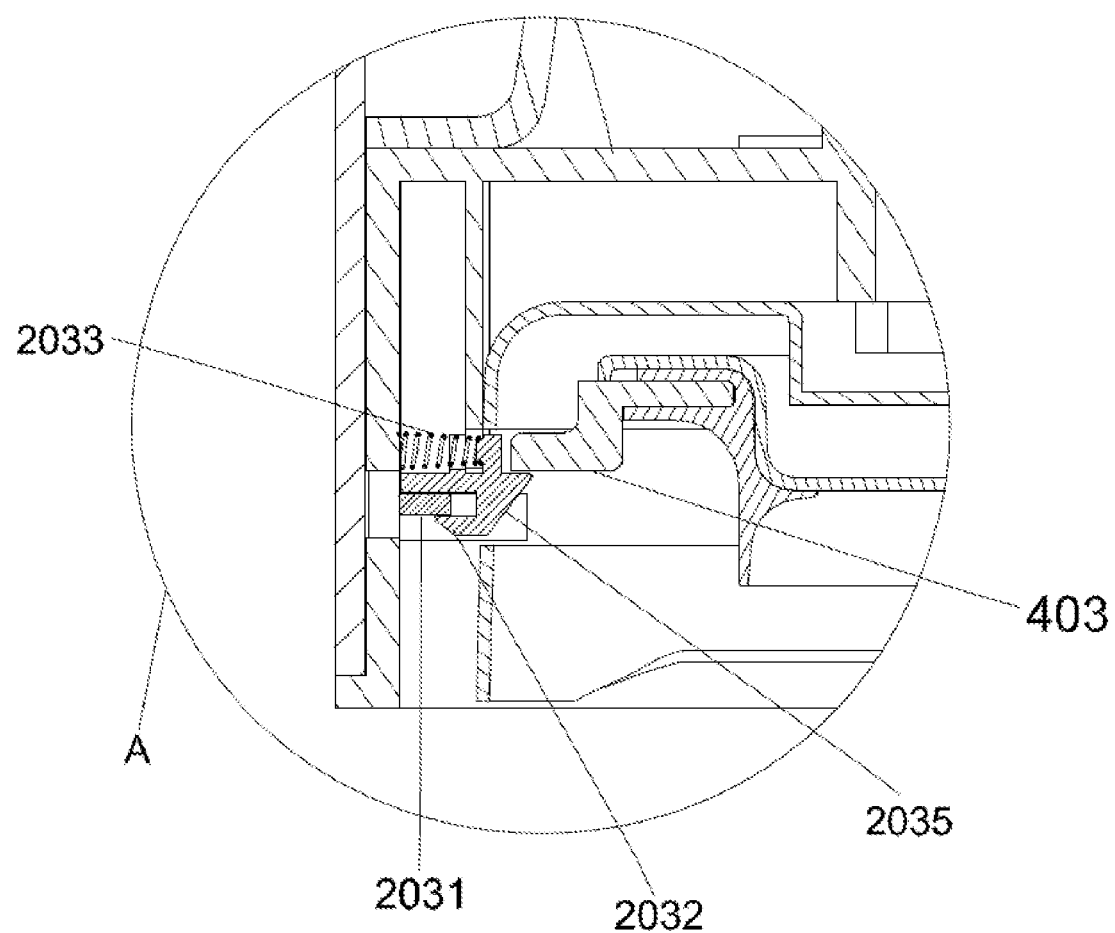
FIG. 11 is an enlarged schematic structural view of position A in FIG. 10.

As shown in FIG. 10 and FIG. 11, this embodiment is similar to Embodiment 1, except that in this embodiment, the first position limiting member 300 is a positioning hole connected to the heat insulation assembly 200, and the first position limiting mechanism 700 is a first protruding portion cooperated with first position limiting member 300; the second position limiting mechanism 403 is a second protruding portion, and the second position limiting member 203 is provided with a sliding block 2032 connected with a heat insulation assembly 200 by a positioning plate 2031; an elastic member 2033 is provided between the sliding block 2032 and the heat insulation assembly 200 and the sliding block is provided with a position limiting protruding portion 2034 connected with the second position limiting mechanism 403 and the elastic member 2033.

Under the action of the elastic member 2033, the sliding block 2032 is capable of moving reciprocally relative to the heat insulation assembly 200. The sliding block 2032 is provided with a sliding surface. When the second position limiting mechanism 403 is mounted, movement of the sliding block 2032 relative to the heat insulation assembly 200 is realized by pressing the sliding surface. When the second position limiting mechanism 403 crosses the sliding surface, the sliding block 2032 is reset under the action of the elastic member 2033, and the connection between the second position limiting mechanism 403 and the second position limiting member 203 is realized. The connection between the second position limiting mechanism 403 and the second position limiting member 203 is cooperated with the connection of the first position limiting member 300 and the first position limiting mechanism 700 to realize the fixation of the first member 600 or the second member 400.

Obviously, the above-mentioned embodiments of the present invention are merely examples for clearly illustrating the present invention, rather than limiting the embodiments of the present invention. For those skilled in the art, other different forms of changes or variations can be made based on the above description. There is no need to exhaustively list all implementations. Any modification, equivalent replacement and improvement made within the spirit and principle of the present invention should be included in the protection scope of the claims of the present invention.

What is claimed is:

1. A multifunctional cooker, comprising a cooker body and an upper cover assembly, wherein the upper cover assembly is provided with a heating assembly and a wind power assembly, the cooker body is provided with an inner pot, and the multifunctional cooker is provided with a first member which is connectable with the upper cover assembly, the first member pressing against an edge of the inner pot, the first member being capable of sealing the cooker body, the first member being capable of releasing pressure when the pressure inside the cooker body exceeds a threshold, wherein the upper cover assembly is provided with a first position limiting member, and the first member is provided with a first position limiting mechanism which is cooperatively connectable with the first position limiting member; the upper cover assembly is provided with a second position limiting member, and the first member is provided with a second position limiting mechanism which is cooperatively connectable with the second position limiting member, wherein the first member is provided with a cover portion and a ring portion, the ring portion is sealedly connected with the cover portion by a sealing gasket, the first position limiting mechanism is fixedly connected with the cover portion, and the second position limiting mechanism is connected with the cover portion by a sealing ring; the cover portion has a plate-shaped main part and a flange part surrounding the main part and bent upwardly relative to the main part, the main part is formed with a through hole offset from a central axis of the main part, the first member is provided with a pressure limiting valve assembly, wherein a gap is formed between the first position limiting mechanism and the cover portion to accommodate the first position limiting member, the sealing gasket is provided with an arc-shaped structure and seals a connection between the first member and the inner pot of the cooker body; and the pressure limiting valve assembly is provided with an exhaust pipe which is arranged in an up-down direction and a protective shield which is connected with a lower surface of the main part of the cover portion and covers the exhaust pipe, the exhaust pipe is connected with the cover portion by the sealing ring, and the exhaust pipe extends through the through hole of the main part of the cover portion.

2. The multifunctional cooker according to claim 1, wherein the first member is a cover-shaped structure cooperated with a structure of the cooker body, and the first member of the cover-shaped structure seals the cooker body.

3. The multifunctional cooker according to claim 1, wherein the first position limiting member is a steel cover structure provided on the upper cover assembly, the first position limiting member is capable of realizing a fixed connection between the upper cover assembly and the cooker body, and the first position limiting mechanism is a position limiting pair connected with the first position limiting member.

4. The multifunctional cooker according to claim 3, wherein the second position limiting member is a position limiting hole on the first position limiting member, and the second position limiting mechanism is a position limiting post on the first member.

5. The multifunctional cooker according to claim 1, wherein the upper cover assembly is provided with a heat insulation assembly, the first position limiting member being a positioning hole provided on the heat insulation assembly, and the first position limiting mechanism being a first protruding portion cooperated with the positioning hole.

6. The multifunctional cooker according to claim 5, wherein the second position limiting mechanism is a second protruding portion, and the second position limiting member is provided with a sliding block slidingly connected with the heat insulation assembly by a positioning plate, an elastic member being provided between the sliding block and the heat insulation assembly, the sliding block being provided with a sliding surface cooperated with the second protruding portion, the sliding block being provided with a position limiting protruding portion connected with the second protruding portion and the elastic member.

7. The multifunctional cooker according to claim 1, wherein the multifunctional cooker is provided with a second member, and the second member is sealedly connectable with the cooker body and the upper cover assembly.

8. The multifunctional cooker according to claim 7, wherein the second member is a lantern ring structure cooperated with a structure of the cooker body, and the second member realizes an airtight connection between the upper cover assembly and the cooker body.

9. The multifunctional cooker according to claim 7, wherein the second member is provided with the first position limiting mechanism.

10. The multifunctional cooker according to claim 9, wherein the second member is provided with the second position limiting mechanism.

11. The multifunctional cooker according to claim 10, wherein the first position limiting member is a steel cover structure provided on the upper cover assembly, the first position limiting member is capable of realizing a fixed connection between the upper cover assembly and the cooker body, and the first position limiting mechanism is a position limiting pair connected with the first position limiting member.

12. The multifunctional cooker according to claim 11, wherein the second position limiting member is a position limiting hole on the first position limiting member, and the second position limiting mechanism is a position limiting post on the first member.

13. The multifunctional cooker according to claim 10, wherein the upper cover assembly is provided with a heat insulation assembly, the first position limiting member being a positioning hole provided on the heat insulation assembly, and the first position limiting mechanism being a first protruding portion that is cooperated with the positioning hole.

14. The multifunctional cooker according to claim 13, wherein the second position limiting mechanism is a second protruding portion, and the second position limiting member is provided with a sliding block slidingly connected with the heat insulation assembly by a positioning plate, an elastic member being provided between the sliding block and the heat insulation assembly, the sliding block being provided with a sliding surface cooperated with the second protruding portion, the sliding block being provided with a position limiting protruding portion connected with the second protruding portion and the elastic member.

15. The multifunctional cooker according to claim 5, wherein the heat insulation assembly is provided with a first heat insulation shield and a second heat insulation shield, a second protective shield being provided between the heating assembly and the second heat insulation shield; and the wind power assembly is provided with a fan provided between the second protective shield and the second heat insulation shield, the fan being driven by the wind power assembly to rotate.

16. The multifunctional cooker according to claim 7, wherein the second member is provided with a first ring portion and a second ring portion, the second ring portion being sealedly connected with the first ring portion by a second sealing gasket; the first position limiting mechanism being fixedly connected with the first ring portion, the second position limiting mechanism being connected with the first ring portion by a sealing ring; and the first ring portion being provided with a protruding portion for fixing the second position limiting mechanism and the first position limiting mechanism.

* * * * *